US010666635B2

(12) United States Patent
Venkateswaran et al.

(10) Patent No.: US 10,666,635 B2
(45) Date of Patent: May 26, 2020

(54) ADAPTIVE AUTHENTICATION SYSTEMS AND METHODS

(71) Applicant: Intel Corporation, Santa Clara, CA (US)

(72) Inventors: Venky P. Venkateswaran, Folsom, CA (US); Jason Martin, Beaverton, OR (US); Gyan Prakash, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/282,601

(22) Filed: Feb. 22, 2019

(65) Prior Publication Data
US 2019/0190901 A1    Jun. 20, 2019

Related U.S. Application Data

(63) Continuation of application No. 14/127,215, filed as application No. PCT/US2013/043482 on May 30, 2013, now abandoned.

(51) Int. Cl.
| | | |
|---|---|---|
| *H04L 29/06* | (2006.01) | |
| *G06F 21/31* | (2013.01) | |
| *H04W 12/06* | (2009.01) | |
| *H04W 12/00* | (2009.01) | |

(52) U.S. Cl.
CPC ............ *H04L 63/08* (2013.01); *G06F 21/31* (2013.01); *H04L 63/107* (2013.01); *H04W 12/06* (2013.01); *G06F 2221/2111* (2013.01); *G06F 2221/2113* (2013.01); *H04W 12/00503* (2019.01); *H04W 12/00504* (2019.01)

(58) Field of Classification Search
CPC ...... H04L 63/08; H04L 63/107; H04W 12/06; H04W 12/00503; H04W 12/00504; G06F 21/31; G06F 2221/2113; G06F 2221/2111
USPC .......................................................... 726/19
See application file for complete search history.

(56) References Cited

U.S. PATENT DOCUMENTS

2003/0054800 A1*  3/2003  Miyashita ............... H04M 1/67
                                                  455/411
2003/0140246 A1   7/2003  Kammer et al.
(Continued)

FOREIGN PATENT DOCUMENTS

| CN | 101854581 A | 10/2010 |
|---|---|---|
| CN | 102404686 A | 4/2012 |

OTHER PUBLICATIONS

China National Intellectual Property Administration, Third Office Action dated May 5, 2019 in Chinese Patent Application No. 201380076053.5.

(Continued)

*Primary Examiner* — Kamiz Zand
*Assistant Examiner* — Aubrey H Wyszynski
(74) *Attorney, Agent, or Firm* — Trop, Pruner & Hu, P.C.

(57) ABSTRACT

An embodiment includes a method executed by at least one processor comprising: determining a first environmental factor for a mobile communications device; determining a first security authentication level based on the determined first environmental factor; and allowing access to a first module of the mobile communications device based on the first security authentication level. Other embodiments are described herein.

25 Claims, 4 Drawing Sheets

(56) References Cited

U.S. PATENT DOCUMENTS

| | | | |
|---|---|---|---|
| 2005/0039013 A1* | 2/2005 | Bajikar | G06F 21/32 |
| | | | 713/172 |
| 2010/0048167 A1* | 2/2010 | Chow | H04L 29/12594 |
| | | | 455/410 |
| 2012/0159183 A1* | 6/2012 | Adams | G06F 21/577 |
| | | | 713/189 |
| 2013/0104187 A1 | 4/2013 | Weidner | |
| 2013/0110957 A1 | 5/2013 | Siegel et al. | |
| 2013/0133052 A1 | 5/2013 | Davis et al. | |

OTHER PUBLICATIONS

The International Searching Authority, International Search Report and Written Opinion dated Feb. 28, 2014 in International Application No. PCT/US2013/043482.

European Patent Office, European Search Report dated Dec. 16, 2016 in European Patent Application No. 13885842.8.

European Patent Office, Communication pursuant to Article 94(3) EPC, dated Jan. 23, 2019 in European Patent Application No. 13885842.8, six pages.

State Intellectual Property Office, Second Office Action dated Dec. 5, 2018 in Chinese Patent Application No. 201380076053.5, 18 pages.

State Intellectual Property Office, First Office Action dated Feb. 11, 2018 in Chinese Patent Application No. 201380076053.5, 9 pages.

European Patent Office, Communication pursuant to Article 94(3) EPC) as dated Mar. 19, 2018 in European Patent Application No. 13 885 842.8.

European Patent Office, Communication pursuant to Article 94(3) EPC) as dated May 29, 2017 in European Patent Application No. 13 885 842.8.

* cited by examiner

ADAPTIVE AUTHENTICATION SYSTEMS AND METHODS

CROSS-REFERENCE TO RELATED APPLICATIONS

This application is a continuation of U.S. patent application Ser. No. 14/127,215, filed Dec. 18, 2013, and entitled "Adaptive Authentication Systems and Methods", which is a § 371 National Stage Entry of International Application No. PCT/US2013/043482, filed May 30, 2013, and entitled "Adaptive Authentication Systems and Methods". The content of each of the above applications is hereby incorporated by reference.

TECHNICAL FIELD

An embodiment of the invention concerns security for mobile computing nodes.

BACKGROUND

Mobile computing nodes provide convenience to users by allowing the users to perform various tasks from a variety of locations. Mobile computing nodes include, for example, cellular phones, smartphones, tablets, Ultrabooks®, notebooks, laptops, personal digital assistants, and mobile processor based platforms. However, to achieve convenience many users use no or very limited security protection for their devices. The users that do use such security protection, such as typing in long alphanumeric passwords before accessing their devices, are prompted for authentication many, many times per day. These repetitive prompts for authentication are intrusive to the user and limit the convenience of their mobile devices.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Figure 1:
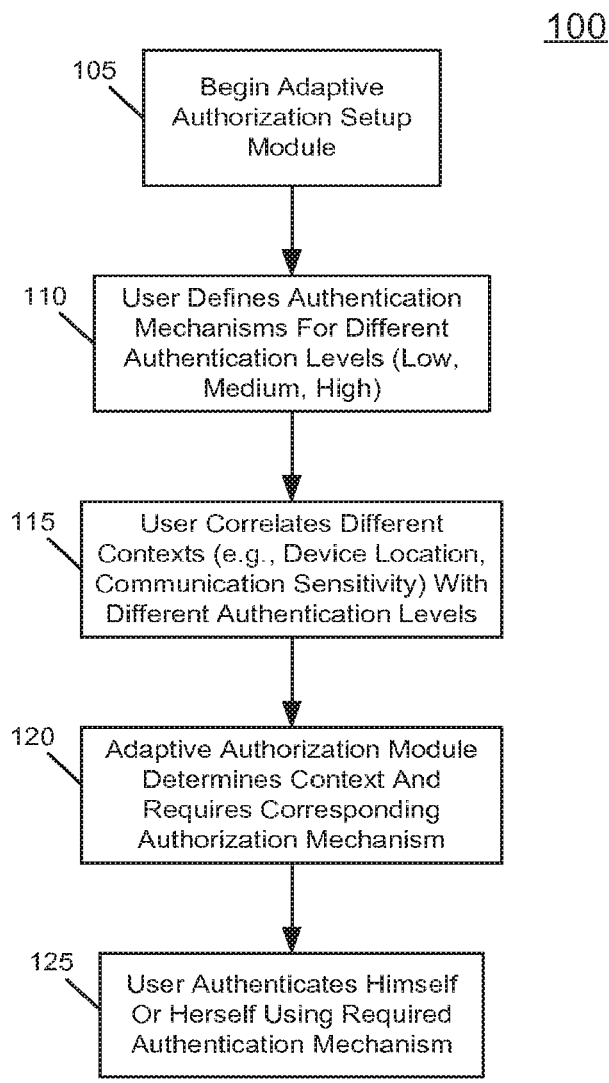
FIG. 1 includes a schematic flow chart for an embodiment of the invention.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted. The phrase "embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Many users use their mobile devices in "familiar" places where the user repetitively uses the device. Such places include, for example, the user's home, workplace, automobile, and the like. An embodiment includes a mobile device that implements adaptive authentication. The embodiment allows a user to authenticate himself or herself to the mobile device more easily in familiar environments than in unfamiliar environments. For example, a user may authenticate herself to her mobile device using voice recognition when the device senses the device is located in the a place regularly frequented by the user (e.g., the user's home), but the user may have to authenticate herself to her mobile device using an alphanumeric password when the device senses the device is located in a location not regularly frequented by the user (e.g., an airport). This fosters security compliance by balancing security and convenience because users will be more likely to use adequate security (e.g., complex passwords) if they are not forced to constantly have to comply with such measures (e.g., entering long passwords), even in low risk situations like sitting in their home or office. Other embodiments are described herein.

Many users use their mobile devices to receive communications that are more sensitive or formal than other communications. For example, an email from a co-worker may be deemed highly formal, whereas a short message service (SMS) text from a son or daughter may be deemed informal. An embodiment includes a mobile device that implements adaptive authentication. The embodiment allows a user to authenticate himself or herself to the mobile device more easily to see or access informal communications than for more formal communications. For example, a user may authenticate herself to her mobile device using fingerprint recognition when the device determines an informal communication has been received (e.g., a text from a sibling), but the user may have to authenticate herself to her mobile device using a alphanumeric password when the device senses a more formal communication has been received (e.g., a voice message from an unknown third party). Other embodiments are described herein.

The above examples are used for illustrative purposes and other embodiments are described herein. A more general discussion now follows.

An embodiment changes device authentication mechanisms from easy to hard and/or hard to easy based on, for example, the context for a situation. For example, an embodiment may change device authentication requirements based on data the device receives and the sensitivity of the data. Thus, an email received with a "top secret" flag or designation or an instant message received from a non-whitelisted party (e.g., party not previously listed in a whitelist stored in a memory coupled to the communications device) may require stronger authentications.

An embodiment allows a user to define a device authentication policy based on data sensitivity, device location, and/or other forms of device or communication context (also referred to as "environmental factor" or "environmental context" or "communication characteristic"). Such context may further include ambient noise. The authentication policy may require authentication based on more than one contextual factor. For example, a user may receive a video chat session while he and his mobile device are in his home. The authentication policy may consider this context to satisfy a "safe zone" whereby no authentication is needed to view the session (because the user is in his home, which he previously designated a safe place). However, the mobile device may sense (or receive sensed information) a great deal of ambient noise near the phone. Such noise may indicate a gathering is taking place (e.g., a party) such that the user is not necessarily alone. In such a case, the authentication policy may "override" the initial safe zone indication (based on the phone being located at the user's home) and instead require a heightened level of authentication. This heightened level of authentication may include any level of authentication considering, in this example, the initial setting was to require no authentication because the phone was located at the user home.

In an embodiment, a heightened authentication level (e.g., requiring a strict password such as a 9 character alphanumeric password) may be needed when the mobile communications device is not connected to a wireless communications network such as, for example, a 4G cellular network or a WiFi network. In such a case the policy may determine that determining the user's location will be difficult because triangulation (via the wireless network) is not readily available (assuming the policy chooses not to rely on GPS location due to lack of location specificity or simply by choice). Without determining location, the policy may automatically dictate that the highest level of authentication is required.

Use of one or more adaptive authentication embodiments may provide a user with a less cumbersome manner of securing his or her mobile device. This in turn encourages users to set higher authentication levels for accessing a device, which fosters secure computing. This may alleviate some concerns by enterprises or employers that worry an employee is using a single mobile device to process employer related information (which is sensitive) as well as person information (such as texts that may not be sensitive)—and deciding to treat all information (employer related and personal related) with low security to satisfy convenience wishes.

An embodiment concerns data sensitivity protection such that email received with a "Top Secret" designation, or messages received that are private and personal in nature, require stronger authentications. An embodiment determines communication (e.g., email) sensitivity based on any one or more of an "importance" or "sensitivity" setting or flag for the communication, an email "security setting" (which may include a digital signature, digital certificate, encrypted information in the body of the communication, an encrypted attachment coupled to an email, and the like), the presence of a "voting button", a request for a "delivery receipt" for a message, a request for a "read receipt" for a message, whether an attachment is coupled to the communication, a category for the communication (e.g., red, blue, green), the account the email came from (e.g., from a corporate email account (that may have been previously identified by a corporate IT department as being such) versus a personal email account that was not so identified), and the like. Many of the above flags or designations may be associated with a communications module, such as Microsoft Outlook®. An embodiment may compare the sender of the communication to a whitelist, blacklist, and the like. For example, an email address may be linked to a contact profile for a third party. The user may whitelist a communication from a third party, such as the user's son or daughter, such that no authentication or little authentication (e.g., voice recognition) is needed to access the communication (e.g., email) from the whitelisted contact. However, the user's boss may be blacklisted such that any communication from a computing node associated with the boss's contact profile (e.g., landline phone, mobile phone, desktop, email address, etc.) requires a higher level of authentication to view and/or access (e.g., reply to).

An embodiment may require stronger authentication based on the type of communication received. For example, all texts may require little to no authentication but all voice messages, Multimedia Messaging Service (MMS) communications, and near-field-communications (e.g., mobile device to mobile device communications via Bluetooth® protocol) may require heightened authentication.

Thus, an embodiment includes a mechanism for adaptive mobile device security based on device location and/or the nature of a communication received by the device. An embodiment provides allows a user to set, for example, low, high and medium security level passwords instead of simply requiring no password or a single password for all instances. An embodiment allows for mobile device authentication requirements that change based on the device's location instead of conventional devices with authentication requirements with no concern for the location of the device. Further, an embodiment includes mobile device authentication requirements that change based on data sensitivity, whether the message is private or personal, top secret or work related messages whereas conventional systems had no regard or less regard for such instances.

An embodiment of adaptive authentication modifies the device user's experience (e.g., switching between device authentication factors and/or changing settings such as the lock and screen timeout) via the definition of safe zone policies. A safe zone policy is used to identify device use context in which, for example, device theft is less likely (e.g., a thief is unlikely to be using a stolen smartphone in the smartphone user's home whereas the proper owner of the smartphone is highly likely to use the smartphone in the user's home).

A safe zone policy may vary authentication level based on device context such that when the user is at her office, but is at a meeting where there is lots of ambient noise, the policy may still insist on heightened authentication.

A safe zone policy may vary authentication level based on device context such that when the user is at her office, but is at a meeting where another computing node is attempting near-field-communications (or short range endpoint to endpoint communications such as Bluetooth®) with the computing device, a high level password may be required. Thus, a user may be in his employer's a conference room (a policy designated safe place) but may be near a third party that is visiting the employer. If the third party's computing node is attempting to communicate with the user's computing node (e.g., via Bluetooth® protocol or any other communications protocol), the policy may require a heightened security authorization. Furthermore, in some embodiments this should not imply the device (the user's device and/or the third party's device) is intending to communicate with the other device. For example, if the user's device simply detects the presence of another device (e.g., via a Bluetooth® signal) then the device's policy may require heightened security. However, a user may be in her home (a policy designated safe place) but may be near a third party, such as a stereo system that is attempting Bluetooth® based communications with the user's mobile computing node. The stereo system may be whitelisted and thereby allowed to communicate with the user's mobile communicating node without any authentication (or maybe simple facial recognition).

A user may determine a policy whereby the user sets the policy for low, high, medium or any other level. A user can define face recognition as a medium authentication level, voice authentication as low authentication level, and a long alphanumeric password a high authentication level.

An embodiment may vary the measures to recover a password based on context. For example, a request for a lost password may require little authentication when the request is made in the user's home but may completely disallow such a request (or require a heightened authentication such as an iris scan) when the device is not located in the user's home or other predefined safe place.

FIG. 1 includes a schematic flow chart for method 100 in an embodiment of the invention. In block 105 a user begins or starts an adaptive authorization setup module (or may instead rely on "factory settings" or modifications thereof). In block 110 a user defines authentication mechanisms for different authentication levels. For example, for a low authentication level the user may choose no or little authentication (e.g., voice recognition with a low sensitivity or voice match threshold on a user defined variable threshold). For a medium authentication level the user may require iris and/or facial recognition. The user may require higher authentication (e.g., 12 character alphanumeric password) for a high authentication level. In block 115 the user correlates, defines, and otherwise links authentication levels to various contexts (e.g., environmental factors such as location or communication characteristics such as an email address associated with an email). For example, satisfaction of a location based safe zone (e.g., user's car, home, or workplace) may require only low level authentication. A high level authentication level may be reserved for all undefined situations that do not fit a lower level authentication criterion or criteria. An email marked urgent may require a medium level authentication and a MMS communication from a son or daughter may require low level authentication but a MMS communication from any other party may require high level authentication. In block 120 (after adaptive authorization is completed) an adaptive authorization module may implement the policies by detecting context (e.g., location) and then required a corresponding authorization level. The module may detect various contexts, some of which require low level authorization (e.g., user device is located in user's car) and some of which require high authorization (e.g., email from user's boss) and then demand the highest level authorization. In block 125 the user then authenticates himself or herself in compliance with the adaptive authorization policy.

An embodiment utilizes various authorization policies including access to certain modules (e.g., accessing email may require greater authorization than accessing texts). The policies may work in "reverse" as well. For example, an authorization policy may vary the lock timeout (e.g., time before an unlocked computing node locks itself due to lack of computing activity) based on context (e.g., whether device is in user's home, whether the user's device is located in his bedroom (lower authorization level) or in a family space like a living room (higher authorization level)). The same may be performed with a screen lockout (e.g., time before screen locks out).

Figure 2:
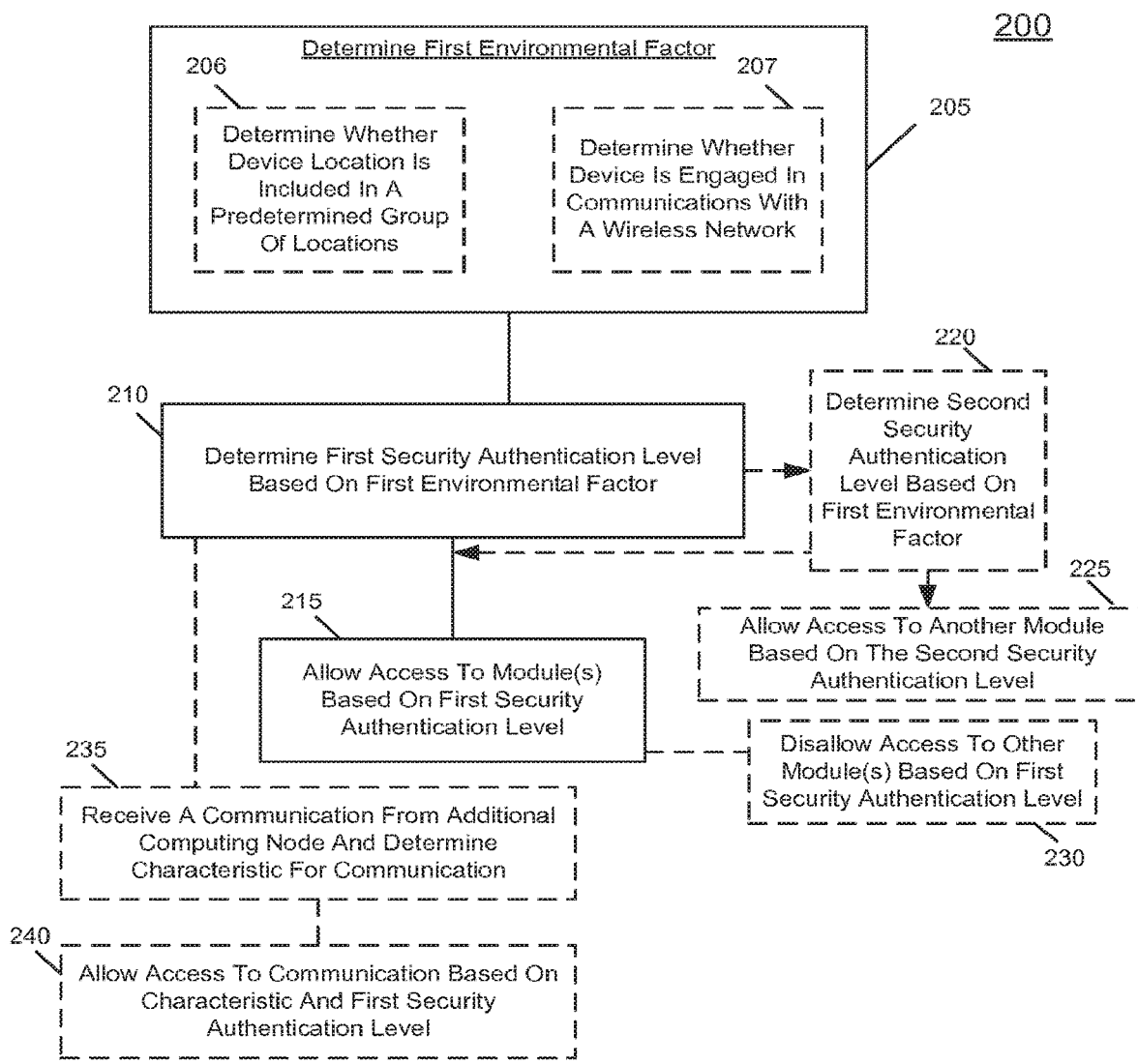
FIG. 2 includes a schematic flow chart for an embodiment of the invention.

FIG. 2 includes a schematic flow chart for method 200 in an embodiment of the invention.

Block 205 includes determining a first environmental factor for a mobile communications device. Different embodiments handle this in different ways. For example, an option (an optional path being designated with dashed lines) in one embodiment includes determining the first environmental factor by determining a location of the mobile communications device. For example, the location of the device may be determined via triangulation from cellular network nodes (e.g., cellular phone towers), triangulation via WiFi nodes or "hotspots", triangulation via radio frequency (RF) signal tracking, global positioning systems (GPS), proximity to Bluetooth® beacons, and the like. Some embodiments may determine location partly or entirely based on altitude or atmospheric pressure.

Block 206 includes determining whether the location is included in a predetermined group of locations. Different embodiments have different granularity towards this issue. For example, an embodiment may simply want to determine whether the device is located in the United States of America or not located in United States of America, whether the device is located within a specific region of China, whether the device is located in a user's car (e.g., by determining the device is in Bluetooth® communication with the car), whether the device is located in the user's workplace or home, whether the device is located within the user's second floor bedroom or the user's first floor living room (e.g., based on altitude sensors, Bluetooth® beacon systems, and the like). Any of these locations may be included in a predetermined list of locations. That list may be configured by the user or possibly by the user's employer (allowing employer related materials to only be accessible in country X but never in country Y or any country other than country X).

Block 210 includes determining a first security authentication level based on the determined first environmental factor. For example, the device may determine a high security authentication level (which requires alphanumeric password entry) is needed because the determined device location is not included in the predetermined list of locations. A determination the device is in the user's bedroom may call for a low level of security (e.g., no authentication is required) whereas determination the device is in the user's kitchen may require a low level of authentication (e.g., voice recognition). In an embodiment a determination the phone is located in a community with an above average crime level may result in requiring higher levels of authentication.

Block 215 includes allowing access to a first module of the mobile communications device based on the first security authentication level. For example, if a high level of authentication was required via block 210, block 215 may allow access to email based on satisfaction of the high level of authentication. Block 215 may allow access to a baseline of modules (e.g., access to music stored on the device) with no need for authorization but satisfaction of the high level of authentication if email is accessed.

Block 230 includes disallowing access to a second module of the mobile communications device based on the first security authentication level. Thus, if the first security authentication level is moderate then access to SMS messages may be allowed but no access to email is allowed. In an embodiment the modules may be divided along lines such as business and personal. For example, one module may include access to business email accounts, business voice mail accounts, and documents stored in segregated memory reserved for business related documents and materials. Another module may include access to personal email accounts, personal voice mail accounts, and documents stored in segregated memory reserved for personal related documents and materials (or in generally available memory). The difference between business and personal may be based on a number of factors, such as a "whitelist" of email addresses that shunt those emails to the business module and "graylist" of SMS addresses/numbers that shunt those messages to the personal module. The business module may require higher authentication than the personal module. The business module may ban access entirely if the user is not located within a certain location (e.g., the business module is inaccessible if the user is not located on a particular military base to decrease the opportunity for top secret communications to be viewed off the base).

The division between modules may be enforced using a number of technologies such as, for example, a secure mode such as with a secure sandbox format. For example, a sandbox may include a security mechanism for separating running programs. It may be used to operate content, such as code, or access data on a business versus personal division. The sandbox environment may provide a tightly-controlled set of resources for programs to run in, such as scratch space on disk and memory. Network access, the ability to inspect the host system or read from input devices may be disallowed or heavily restricted. A sandbox may be implemented using virtualization technology. An application may even be executed on the cloud while in a sandboxed environment.

Block 220 includes determining a second security authentication level based on the determined first environmental factor. Block 225 includes allowing access to a second module of the mobile communications device based on the second security authentication level. Thus, determining a user is in her home may result in requiring voice recognition to access email and alphanumeric passwords to access attachments to the email. Access to the attachment via voice recognition is not allowed. Access to documents stored in a sandboxed environment may not be allowed at all due to the user being located at her home and not at her office or because she is located in country X which is included in a blacklist of countries.

Block 207 includes determining the first environmental factor by determining whether the communications device is communicatively coupled to a wireless communications network. Thus, determining the device is receiving periodic pings or messages from a cellular network may indicate the user's location can be identified and thus, a lower level of authentication may be required. However, determining the communications device is communicatively coupled to a wireless communications network may also indicate a negative to the user's use policy. For example, in an embodiment recognition of such communication could be indicative of a risk the device is being snooped by other devices. In an embodiment, determining the first environmental factor includes determining whether the communications device has communicated a threshold level of data via the wireless communications network. Thus, an occasional ping from a cellular tower may not increase security levels. The same is true for an occasional Bluetooth® communication. However, a snooped device may be unwittingly communicating an amount of information that exceeds a threshold and thus require a higher security authentication level. The same may be true for simple internet browsing. However, in some embodiments certain networks may be whitelisted (e.g., a home network) whereas other networks are not whitelisted (e.g., a coffee shop network) and thus require higher security. Furthermore, different communications (e.g., cellular vs. WiFi) may require different security levels.

Blocks 235, 240 include receiving a communication from an additional computing node; determining a first characteristic for the communication; determining a second security authentication level based on the determined first characteristic; and allowing access to the communication based on the first and second security authentication levels. Thus, in an embodiment a user may receive an email. A characteristic for that email may include the email address (or some portion thereof like a domain portion that is recognized as the domain of the person's employer), a prioritization flag, a size of the email. Characteristics of other communications may be the type of communication. For example, a SMS message may call for lower priority than voice messages or phone calls. SMS messages from certain phone numbers may require lower priority than other from other phone numbers. Access to these communications may thus be based on multiple security levels such as one based on proximity of the device as well as another based on the characteristic of the communication. In an embodiment the highest security level may win out. For example, if location dictates voice recognition is fine but the communication characteristic (e.g., the email is from a whitelist including that indicates the email is from the user's boss) dictates retinal scanning, then retinal scanning may be required for viewing the email.

Another embodiment (in addition to or instead the subject matter of blocks 235, 240) may include receiving a communication from an additional computing node; determining a first characteristic for the communication; and allowing access to the communication based on the first characteristic and the first security authentication level. In this situation the first security level may completely determine the security level needed to access the communication.

Embodiments may rely on an environmental factor selected from one or more of the group comprising (a) location of the communication device, (b) whether the communications device is communicatively coupled to a wireless communications network, (c) time of day (e.g., requiring very high security at 2 a.m.), (d) audible noise sensed by the communications device (e.g., requiring very high security at a noisy transit station), and (e) altitude sensed by the communications device.

An embodiment may include determining the first security authentication level by selecting a first security authentication level but not selecting a second security authentication level or a third security level, the first, second, and third security authentication levels being included in a plurality of security authentication levels. Thus, there may be a plurality of levels to choose from rather than a simple scenario where either no security is needed or some security is needed.

In such an embodiment the first security authentication level corresponds to a first authentication module, the second security authentication level corresponds to a second authentication module, and the third security authentication level corresponds to a third authentication module; wherein the first, second, and third security authentication modules are each selected from the group comprising retinal scanning, iris scanning, facial recognition, a password having a first length, a password having a second length longer than the first length, fingerprint recognition, voice recognition, a personal identification number (PIN), a radio frequency identification (RFID), a security token, and a biometric.

Figure 3:
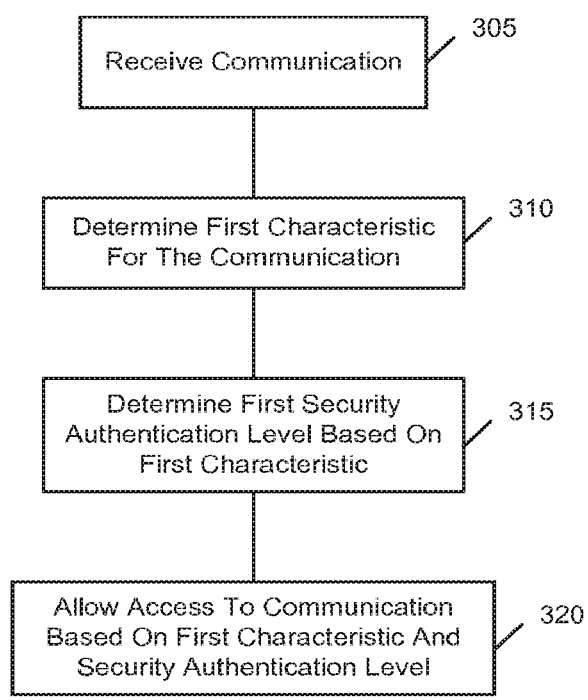
FIG. 3 includes a schematic flow chart for an embodiment of the invention.

FIG. 3 includes a method in an embodiment. FIG. 3 shows that blocks 235, 240 may exist separately from the rest of FIG. 2 (and FIG. 2 may exist separate from blocks 235, 240). Block 305 includes receiving a communication from a computing node. Block 310 includes determining a first characteristic for the communication. Block 315 includes determining a first security authentication level based on the determined first characteristic. Block 320 includes allowing access to the communication based on the first characteristic and the first security authentication level.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving storage. A medium may include any mechanism for storing, transmitting, or receiving information in a form readable by a machine, and the medium may include medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 4:
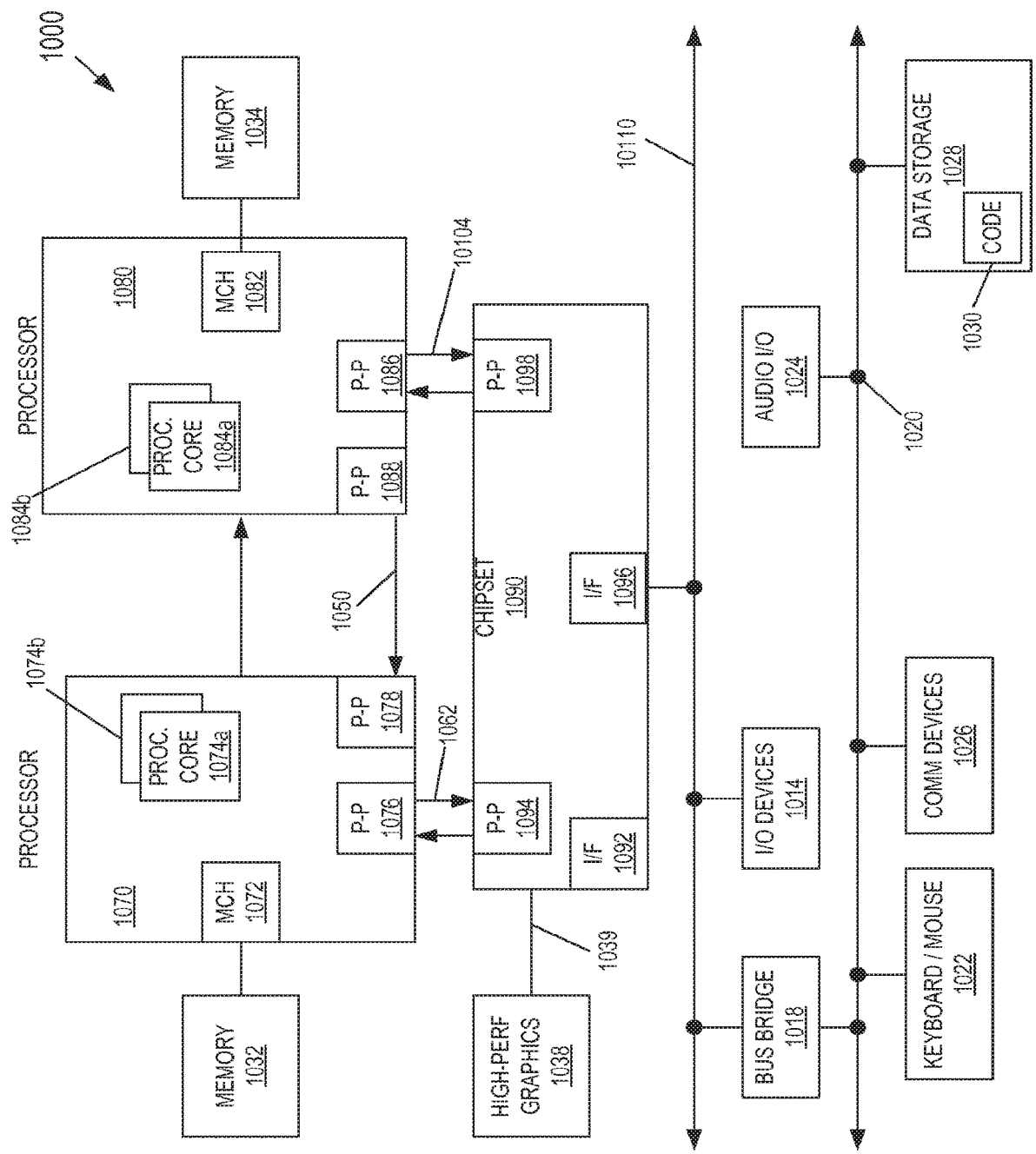
FIG. 4 includes a mobile computing node in an embodiment of the invention.

Referring now to FIG. 4, shown is a block diagram of a system embodiment 1000 in accordance with an embodiment of the present invention. Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of the Figure may alternatively be partitioned using more or fewer integrated chips than shown in the Figure.

A first example includes a method executed by at least one processor comprising: determining a first environmental factor for a mobile communications device; determining a first security authentication level based on the determined first environmental factor; and allowing access to a first module of the mobile communications device based on the first security authentication level.

In example 2 the subject matter of the Example 1 can optionally include disallowing access to a second module of the mobile communications device based on the first security authentication level.

In example 3 the subject matter of the Examples 1-2 can optionally include determining a second security authentication level based on the determined first environmental factor; and allowing access to a second module of the mobile communications device based on the second security authentication level. For example, the first environmental factor may include determining a location for the device is the user's bedroom. As a result, the device may determine a first security authentication level (e.g., a low level needed to access photographs in a first module) and a second security level (e.g., a higher level needed to access emails in second module) are satisfied.

In example 4 the subject matter of the Examples 1-3 can optionally include determining the first environmental factor includes determining a location of the mobile communications device.

In example 5 the subject matter of the Examples 1-4 can optionally include determining whether the location is included in a predetermined group of locations.

In example 6 the subject matter of the Examples 1-5 can optionally include determining the first environmental factor includes determining whether the communications device is communicatively coupled to a wireless communications network.

In another embodiment of example 6 the subject matter of the examples 1-5 can optionally include determining the first environmental factor by detecting transmissions from another computing node. Such transmissions may be RF transmissions. For example, in one embodiment if the device detects an additional device nearby (e.g., by "snooping" transmissions for the additional device), it restricts access/heightens security authentication level(s). This does not necessarily mean that the additional device is "coupled" to the user's device, only that the user's device can "hear" the additional device. For example, RF technologies (e.g., Bluetooth® and Wi-Fi) regularly emit transmissions to discover and/or maintain connections (e.g., "discovery" transmissions). Those transmissions are not part of any specific connection, but since they are wireless they can be observed by any device nearby (including the user's device). Hence the user's device can "listen" for those transmissions (e.g., such as these "discovery" transmissions) to identify devices nearby. Whether detection of such a device triggers a higher security level may depend on, in some embodiments, whether the detected device is recognized (e.g., included in a whitelist or the like). Such an embodiment may also listen to transmissions between an additional device and any other node (even without being able to identify the contents of the transmissions due to encryption). Thus, if the additional device is connected to Wi-Fi and the user's device detects this, then the policy may detect higher security. In an embodiment, a time threshold may be used such that the security level is determined based on whether the communication node has detected transmissions from another node in the previous X minutes (e.g., 1, 5, 10, 15 minutes).

In example 7 the subject matter of the Examples 1-6 can optionally include wherein determining the first environmental factor includes determining whether the communications device has communicated a threshold level of data via the wireless communications network of example 6.

In example 8 the subject matter of the Examples 1-7 can optionally include receiving a communication from an additional computing node; determining a first characteristic for the communication; determining a second security authentication level based on the determined first characteristic; and allowing access to the communication based on the first and second security authentication levels.

In example 9 the subject matter of the Examples 1-8 can optionally include receiving a communication from an additional computing node; determining a first characteristic for the communication; and allowing access to the communication based on the first characteristic and the first security authentication level.

In example 10 the subject matter of the Examples 1-9 can optionally include wherein the first environmental factor is selected from one or more of the group comprising location of the communication device, whether the communications device is communicatively coupled to a wireless communications network, time of day, whether the communications device detects transmissions from another computing node, audible noise sensed by the communications device, and altitude sensed by the communications device.

In example 11 the subject matter of the Examples 1-10 can optionally include wherein determining the first security authentication level includes selecting the first security authentication level but not selecting second or third security authentication levels, the first, second, and third security authentication levels being included in a plurality of security authentication levels.

In another embodiment of example 11 the subject matter of the Examples 1-10 can optionally include determining a second environmental factor for the mobile communications device; and determining the first security authentication level based on the determined first and second environmental factors. Such first and second factors may include device location and the detection of transmissions from another computing node.

In example 12 the subject matter of the Examples 1-11 can optionally include wherein the first security authentication level corresponds to first authentication module, the second security authentication level corresponds to a second authentication module, and the third security authentication level corresponds to a third authentication module; wherein the first, second, and third security authentication modules are each selected from the group comprising retinal scanning, iris scanning, facial recognition, a password having a first length, a password having a second length longer than the first length, fingerprint recognition, voice recognition, a personal identification number (PIN), a radio frequency identification (RFID), a security token, and a biometric. The biometric may include, without limitations, recognition of a user's vein or vessel pattern or characteristic, hand geometry, ocular blood vessels, gait, electrocardiogram, keyboard/mouse/touch/gesture dynamics, eye movements and the like. Additional "password-like" mechanisms may include recognition of a user's picture password, drawable pattern, passphrase, and the like. Additional "token-like" mechanisms may include, for example, a wearable companion device (e.g., watch, headset, head-mounted display, and the like), smartcard, SIM card, docking station or other peripherals, medical sensor device, and the like.

In another embodiment of example 12 the subject matter of the Examples 1-11 can optionally include wherein determining the first security authentication level includes selecting the first security authentication level but not selecting second or third security authentication levels, the first, second, and third security authentication levels being included in a plurality of security authentication levels; wherein the first security authentication level corresponds to first authentication module, the second security authentication level corresponds to a second authentication module, and the third security authentication level corresponds to a third authentication module; wherein the first, second, and third security authentication modules are each selected from the group comprising retinal scanning, iris scanning, facial recognition, a password having a first length, a password having a second length longer than the first length, fingerprint recognition, voice recognition, a personal identification number (PIN), a radio frequency identification (RFID), a security token, and a biometric In example 13 the subject matter of the Examples 1-12 can optionally include an apparatus comprising means for performing any one of claims 1 to 12.

In example 14 the subject matter of the Examples 1-12 can optionally include at least one storage medium having instructions stored thereon for causing a system to carry out a method according to any one of claims 1 to 12.

Example 15 includes a method executed by at least one processor comprising: receiving a communication from a computing node; determining a first characteristic for the communication; determining a first security authentication level based on the determined first characteristic; and allowing access to the communication based on the first characteristic and the first security authentication level.

In example 16 the subject matter of the Example 15 can optionally include wherein determining the first security authentication level includes selecting the first security authentication level but not selecting second or third security authentication levels, the first, second, and third security authentication levels being included in a plurality of security authentication levels.

In another embodiment of example 16 the subject matter of the Example 15 can optionally include determining a second characteristic for the communication; and determining the first security authentication level based on the determined first and second characteristics. For example, the first characteristic may be the type of message (e.g., SMS text versus voice message) and the second characteristic may be the identity of the sender. Thus, a text from a daughter may be treated differently than a text from a boss or a voice message from the daughter.

In example 17 the subject matter of the Examples 15-16 can optionally include determining a first environmental factor for a mobile communications device, the mobile computing device including the at least one processor; determining a second security authentication level based on the determined first environmental factor; and allowing access to the communication based on the first and second security authentication levels.

In example 18 the subject matter of the Examples 15-17 can optionally include allowing access to a first module of the mobile communications device based on the second security authentication level and disallowing access to a second module of the mobile communications device based on the second security authentication level.

In example 19 the subject matter of the Examples 15-18 can optionally include wherein determining the first environmental factor includes determining a location of the mobile communications device, the method further comprising determining whether the location is included in a predetermined group of locations.

In example 20 the subject matter of the Examples 15-19 can optionally include wherein determining the first environmental factor includes determining whether the communications device is communicatively coupled to a wireless communications network.

In example 21 the subject matter of the Examples 15-20 can optionally include at least one storage medium having instructions stored thereon for causing a system to carry out a method according to any one of claims 15 to 20.

Example 22 includes an apparatus comprising: at least one memory and at least one processor, coupled to the at least one memory, to perform operations comprising: determining a first environmental factor for a mobile communications device; determining a first security authentication level based on the determined first environmental factor; and allowing access to a first module of the mobile communications device based on the first security authentication level.

In example 23 the subject matter of the Example 22 can optionally include wherein the at least one processor is to perform operations comprising disallowing access to a second module of the mobile communications device based on the first security authentication level.

In another embodiment of example 23 the subject matter of the Example 22 can optionally include determining a second environmental factor for the mobile communications device; and determining the first security authentication level based on the determined first and second environmental factors.

In example 24 the subject matter of the Examples 22-23 can optionally include wherein determining the first environmental factor includes determining a location of the mobile communications device and the at least one processor is to perform operations comprising determining whether the location is included in a predetermined group of locations.

In example 25 the subject matter of the Examples 22-24 can optionally include wherein the at least one processor is to perform operations comprising: receiving a communication from an additional computing node; determining a first characteristic for the communication; determining a second security authentication level based on the determined first characteristic; and allowing access to the communication based on the first and second security authentication levels.

In example 26 the subject matter of the Examples 22-25 can optionally include wherein the at least one processor is to perform operations comprising: receiving a communication from an additional computing node; determining a first characteristic for the communication; and allowing access to the communication based on the first characteristic and the first security authentication level.

An embodiment includes a processing system comprising: means for determining a first environmental factor for a mobile communications device; means for determining a first security authentication level based on the determined first environmental factor; and means for allowing access to a first module of the mobile communications device based on the first security authentication level. An embodiment includes means for disallowing access to a second module of the mobile communications device based on the first security authentication level. An embodiment includes means for determining a second security authentication level based on the determined first environmental factor; and allowing access to a second module of the mobile communications device based on the second security authentication level. An embodiment includes means for determining the first environmental factor by determining a location of the mobile communications device. An embodiment includes means for determining whether the location is included in a predetermined group of locations. An embodiment includes means for determining the first environmental factor by determining whether the communications device is communicatively coupled to a wireless communications network. An embodiment includes means for determining the first environmental factor by determining whether the communications device has communicated a threshold level of data via the wireless communications network. An embodiment includes means for receiving a communication from an additional computing node; means for determining a first characteristic for the communication; means for determining a second security authentication level based on the determined first characteristic; and means for allowing access to the communication based on the first and second security authentication levels. An embodiment includes means for receiving a communication from an additional computing node; means for determining a first characteristic for the communication; and means for allowing access to the communication based on the first characteristic and the first security authentication level.

An embodiment includes a processing system comprising: means for receiving a communication from a computing node; means for determining a first characteristic for the communication; means for determining a first security authentication level based on the determined first characteristic; and means for allowing access to the communication based on the first characteristic and the first security authentication level. An embodiment includes means for determining the first security authentication level by selecting the first security authentication level but not selecting second or third security authentication levels, the first, second, and third security authentication levels being included in a plurality of security authentication levels. An embodiment includes means for determining a first environmental factor for a mobile communications device, the mobile computing device including the at least one processor; means for determining a second security authentication level based on the determined first environmental factor; and means for allowing access to the communication based on the first and second security authentication levels. An embodiment includes means for allowing access to a first module of the mobile communications device based on the second security authentication level and disallowing access to a second module of the mobile communications device based on the second security authentication level. An embodiment includes means for determining the first environmental factor by determining a location of the mobile communications device, the method further comprising determining whether the location is included in a predetermined group of locations. An embodiment includes means for determining the first environmental factor by determining whether the communications device is communicatively coupled to a wireless communications network.

All optional features of the apparatus described above may also be implemented with respect to the method or process described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-readable medium having stored thereon data which, if used by at least one computing system, causes the at least one computing system to perform operations comprising:
   determining a first environmental factor, the first environmental factor corresponding to a first location of a first user;
   determining a second environmental factor, the second environmental factor corresponding to an identity of the first user;
   accessing a first preconfigured authorization policy in response to determining the first environmental factor;
   accessing a second preconfigured authorization policy in response to determining the second environmental factor;
   determining a first security access mechanism in response to accessing the first authorization policy;
   determining a second security access mechanism in response to accessing the second authorization policy;
   determining a third security access mechanism in response to accessing the first authorization policy;
   allowing the first user access to a first module of the at least one computing system when the first user complies with both the first and third security access mechanisms; and
   allowing the first user access to a second module of the at least one computing system in response to the first user's compliance with the second security access mechanism.

2. The at least one machine-readable medium of claim 1 wherein the first preconfigured authorization policy is preconfigured by a second user.

3. The at least one machine-readable medium of claim 2 wherein the second preconfigured authorization policy is preconfigured by the second user.

4. The at least one machine-readable medium of claim 1, the operations comprising:
   receiving an access request from the first user;
   determining the first environmental factor in response to receiving the access request from the first user.

5. The at least one machine-readable medium of claim 1, the operations comprising disallowing the first user access to the first module of the at least one computing system when the first user complies with less than both of the first and third security authentication mechanisms.

6. The at least one machine-readable medium of claim 1, the operations comprising:
   determining a third environmental factor, the third environmental factor corresponding to a second location of the first user;
   accessing the first preconfigured authorization policy in response to determining the third environmental factor.

7. The at least one machine-readable medium of claim 6 wherein:
   the first location of the first user corresponds to the first user's presence on a specific network;
   the second location of the first user corresponds to a country included on a list, the list corresponding to the first authorization policy.

8. The at least one machine-readable medium of claim 1, the operations comprising:
   determining a third environmental factor, the third environmental factor corresponding to a second location of the first user;
   accessing a third preconfigured authorization policy in response to determining the third environmental factor.

9. The at least one machine-readable medium of claim 1 wherein:
   the first module of the at least one computing system is included in a first software application;
   the second module of the at least one computing system is included in a second software application.

10. The at least one machine-readable medium of claim 1 wherein:
    the first module of the at least one computing system is included in a software application;
    the second module of the at least one computing system is included in the software application.

11. At least one non-transitory machine-readable medium having stored thereon data which, if used by at least one computing system, causes the at least one computing system to:
    determine first, second, and third environmental factors;
    access: (a)(i) a first preconfigured authorization policy in response to determining at least one of the first or third environmental factors; and (a)(ii) a second preconfigured authorization policy in response to determining the second environmental factor;
    determine: (b)(i) a first security access mechanism in response to accessing the first authorization policy; (b)(ii) a second security access mechanism in response to accessing the second authorization policy; and (b)(iii) a third security access mechanism in response to accessing the first authorization policy;
    allow the first user access to (c)(i) a first module of the at least one computing system when the first user complies with both the first and third security access mechanisms; and (c)(ii) a second module of the at least one computing system in response to the first user's compliance with the second security access mechanism.

12. The at least one machine-readable medium of claim 11 wherein the first preconfigured authorization policy is preconfigured by a second user.

13. The at least one machine-readable medium of claim 12 having stored thereon data which, if used by the at least one computing system, causes the at least one computing system to:
    receive an access request from the first user;
    determine the first environmental factor in response to receiving the access request from the first user.

14. The at least one machine-readable medium of claim 13 wherein:
    the first environmental factor corresponds to a first location of a first user;
    the second environmental factor corresponds to an identity of the first user; and
    the third environmental factor corresponds to a second location of the first user.

15. The at least one machine-readable medium of claim 14 wherein:
    the first location of the first user corresponds to the first user's presence on a specific network;
    the second location of the first user corresponds to a country.

16. The at least one machine-readable medium of claim 15 wherein:
    the first module of the at least one computing system is included in a first software application;
    the second module of the at least one computing system is included in a second software application.

17. The at least one machine-readable medium of claim 15 wherein:
    the first module of the at least one computing system is included in a software application;
    the second module of the at least one computing system is included in the software application.

18. At least one non-transitory machine-readable medium having stored thereon data which, if used by at least one computing system, causes the at least one computing system to:
    in response to user input from a second user, present the second user with an option to preconfigure a first authorization policy with a first configuration and a second authorization policy with a second configuration;
    wherein preconfiguring the first authorization policy with the first configuration includes configuring the first authorization policy to: (a)(i) be accessed in response to determining at least one of first or third environmental factors, the first environmental factor corresponding to a first location of a first user; (a)(ii) determine first and third security access mechanisms in response to accessing the first authorization policy; (a)(iii) allow the first user access to a first module of the at least one computing system when the first user complies with both the first and third security access mechanisms;
    wherein preconfiguring the second authorization policy with the second configuration includes configuring the second authorization policy to: (b)(i) be accessed in response to determining a second environmental factor, the second environmental factor corresponding to an identity of the first user; (b)(ii) determine a second security access mechanism in response to accessing the second authorization policy; (b)(iii) allow the first user access to a second module of the at least one computing system when the first user complies with the second security access mechanism.

19. The at least one machine-readable medium of claim 18 wherein:
    the first location of the first user corresponds to the first user's presence on a specific network location;
    the third environmental factor corresponds to a second location of the first user;
    the second location of the first user corresponds to a country.

20. The at least one machine-readable medium of claim 19 wherein:

the first module of the at least one computing system is included in a first software application;

the second module of the at least one computing system is included in a second software application.

21. The at least one machine-readable medium of claim 19 wherein:

the first module of the at least one computing system is included in a software application;

the second module of the at least one computing system is included in the software application.

22. At least one non-transitory machine-readable medium having stored thereon data which, if used by at least one computing system, causes the at least one computing system to:

determine first, second, and third environmental factors;

access: (a)(i) a first preconfigured authorization policy in response to determining at least one of the first or third environmental factors; (a)(ii) a second preconfigured authorization policy in response to determining the second environmental factor, and (a)(iii) a third preconfigured authorization policy in response to determining the third environmental factor;

determine: (b)(i) a first security access mechanism in response to accessing the first authorization policy; (b)(ii) a second security access mechanism in response to accessing the second authorization policy; and (b)(iii) a third security access mechanism in response to accessing the third authorization policy;

allow the first user access to (c)(i) a first module of the at least one computing system when the first user complies with both the first and third security access mechanisms; and (c)(ii) a second module of the at least one computing system in response to the first user's compliance with the second security access mechanism.

23. The at least one machine-readable medium of claim 22 wherein the first preconfigured authorization policy is preconfigured by a second user.

24. The at least one machine-readable medium of claim 23 having stored thereon data which, if used by the at least one computing system, causes the at least one computing system to:

receive an access request from the first user;

determine the first environmental factor in response to receiving the access request from the first user.

25. The at least one machine-readable medium of claim 24 wherein:

the first environmental factor corresponds to a first location of a first user;

the second environmental factor corresponds to an identity of the first user; and the third environmental factor corresponds to a second location of the first user.

* * * * *